(12) United States Patent
Lee et al.

(10) Patent No.: US 10,126,891 B2
(45) Date of Patent: Nov. 13, 2018

(54) IN-CELL TYPE DISPLAY DEVICE

(71) Applicant: SAMSUNG DISPLAY CO., LTD., Yongin-si, Gyeonggi-do (KR)

(72) Inventors: Yu Jin Lee, Suwon-si (KR); Ji-Sun Kim, Seoul (KR); Young Wan Seo, Suwon-si (KR); Chong Chul Chai, Seoul (KR)

(73) Assignee: Samsung Display Co., Ltd. (KR)

( * ) Notice: Subject to any disclaimer, the term of this patent is extended or adjusted under 35 U.S.C. 154(b) by 10 days.

(21) Appl. No.: 15/064,027

(22) Filed: Mar. 8, 2016

(65) Prior Publication Data

US 2017/0010708 A1    Jan. 12, 2017

(30) Foreign Application Priority Data

Jul. 10, 2015 (KR) .................. 10-2015-0098633

(51) Int. Cl.
*G06F 3/041* (2006.01)
*G06F 3/044* (2006.01)

(52) U.S. Cl.
CPC ............ *G06F 3/044* (2013.01); *G06F 3/0412* (2013.01); *G06F 2203/04103* (2013.01)

(58) Field of Classification Search
CPC ....... G06F 2203/04103; G06F 3/03547; G06F 3/044; G06F 3/045
USPC .................................................. 345/173–174
See application file for complete search history.

(56) References Cited

U.S. PATENT DOCUMENTS

| | | | |
|---|---|---|---|
| 2008/0174706 A1* | 7/2008 | Kwon | G02F 1/136286 349/12 |
| 2009/0231304 A1* | 9/2009 | Lee | G02F 1/13338 345/174 |
| 2011/0193799 A1* | 8/2011 | Jun | H01L 27/323 345/173 |
| 2014/0062916 A1* | 3/2014 | Hong | G06F 3/041 345/173 |
| 2014/0285466 A1* | 9/2014 | Hayashi | G06F 3/044 345/174 |

FOREIGN PATENT DOCUMENTS

| | | |
|---|---|---|
| KR | 10-1025023 B1 | 3/2011 |
| KR | 10-1322333 B1 | 10/2013 |
| KR | 10-2014-0107920 A | 9/2014 |
| KR | 10-2014-0126287 A | 10/2014 |
| KR | 10-1451742 B1 | 10/2014 |

* cited by examiner

*Primary Examiner* — Roy P Rabindranath
(74) *Attorney, Agent, or Firm* — Innovation Counsel LLP

(57) ABSTRACT

A display device includes: a first substrate including a touch region for sensing a touch and a peripheral area surrounding the touch region; a second substrate facing the first substrate; thin film transistors positioned on the first substrate; pixel electrodes connected to the thin film transistors; common electrodes arranged to transmit a common voltage; sensing wires connected to the common electrodes and arranged to transmit a detection signal for sensing a touch; and a transparent electrode layer positioned on a first surface of the second substrate, the transparent electrode layer having a portion overlapping the peripheral area, and having at least one opening positioned over the touch region.

16 Claims, 14 Drawing Sheets

IN-CELL TYPE DISPLAY DEVICE

CROSS-REFERENCE TO RELATED APPLICATION

This application claims priority to, and the benefit of, Korean Patent Application No. 10-2015-0098633 filed in the Korean Intellectual Property Office on Jul. 10, 2015, the entire contents of which are incorporated herein by reference.

BACKGROUND (a) Technical Field

Embodiments of the present invention relate generally to touch-sensitive display devices. More specifically, embodiments of the present invention relate to in-cell touch type display devices.

(b) Description of the Related Art

Display device technology has seen rapid recent changes. More particularly, a flat panel display having lower profile, light weight, and low power consumption has recently been replacing the conventional cathode ray tube (CRT).

Since one type of flat panel display, the organic light emitting diode display device, is non-emissive, its viewing angle, contrast, etc., are relatively high, and since a backlight is not needed as compared with a liquid crystal display, the organic light emitting diode display device can be thin and lightweight and is advantageous in terms of power consumption. Also, since the organic light emitting diode display device may be driven with a low DC voltage, has a rapid response speed, and is solid, the organic light emitting diode display device tends to be relatively resistant to external impact, has a wide usage temperature range, and particularly, has a low manufacturing cost.

On the other hand, a touch type display device that is capable of inputting a user command by selecting a screen of the image display device by e.g. a hand or another object, is widely used.

To achieve this, the touchscreen panel is disposed on a front face of the image display device to convert a contact position where the person's hand or the object touches, into an electric signal. Accordingly, the instruction selected in the contact position is input as an input signal.

The touch sensing function may be implemented by a touch sensor. The touch sensor may be classified into various touch sensing types such as a resistive type, a capacitive type, an electromagnetic resonance (EMR) type, and an optical sensing type.

In the case of a resistive type touch sensor, two electrodes spaced apart from each other while facing each other may contact each other by a pressure from an external object. When the two electrodes contact each other, the contact positions and the like may be determined by recognizing a change in voltage depending on a change in resistance at the contact position.

The capacitive type touch sensor includes a detection capacitor formed of a detection electrode capable of transferring a detection signal and detecting a change in capacitance of the detection capacitor that is generated when conductors, such as a finger, approach the sensor. This change in capacitance allows the sensor to determine whether contact has occurred, the contact positions, and the like.

The contact detecting sensor may be formed in the touch panel to be attached to the display device (an add-on cell type), may be formed outside a substrate of the display device (an on-cell type), and may be formed inside the display device (an in-cell type). The display device including the contact sensing sensor detects whether the finger of the user or the touch pen contacts the screen, as well as the contact position thereof.

These various touch sensors are disposed in the touch region, and include a plurality of touch electrodes to sense the touch, as well as connection wires connected to the touch electrode. The touch region may overlap the display area. The connection wires may transmit a sensing input signal to the touch electrode. They may also transmit a sensing output signal from the touch electrode generated according to the touch, to a sensing signal controller.

The add-on cell type of liquid crystal display may exhibit certain drawbacks. For example, the thickness of the display device is increased by the touch channel, and the manufacturing cost is increased by a touch panel formation process and a separate substrate required for the touch panel.

Further, the in-cell type display device forming a contact sensing sensor inside the display device limits the structure of the display device when applying it. For example, in the case of the display device in which the electrode is formed in the display panel including the thin film transistor, to prevent static electricity of the upper panel, a rear surface transparent electrode layer is formed in the upper panel. However the rear surface transparent electrode layer often inhibits touch recognition.

The above information disclosed in this Background section is only for enhancement of understanding of the background of the invention and therefore it may contain information that does not form the prior art that is already known in this country to a person of ordinary skill in the art.

SUMMARY

The present invention provides an in-cell type display device capable of recognizing a touch while also having a transparent electrode layer to prevent static electricity in the upper panel.

A display device according to an exemplary embodiment of the present invention includes: a first substrate including a touch region for sensing a touch and a peripheral area surrounding the touch region; a second substrate facing the first substrate; thin film transistors positioned on the first substrate; pixel electrodes connected to the thin film transistors; common electrodes arranged to transmit a common voltage; sensing wires connected to the common electrodes and arranged to transmit a detection signal for sensing a touch; and a transparent electrode layer positioned on a first surface of the second substrate, the transparent electrode layer having a portion overlapping the peripheral area, and having at least one opening positioned over the touch region.

A first insulating layer may be positioned on the thin film transistor; and a second insulating layer may be disposed between the pixel electrodes and the common electrodes, wherein the pixel electrode and the common electrode may be positioned on the first insulating layer.

The common electrodes may be positioned between the pixel electrodes and the first insulating layer, and a common electrode overlapping at least one of the pixel electrodes may form one com pad.

A plurality of the com pads may be present, and each com pad may be respectively connected to a sensing wire.

The display may further include a transparent oxide layer disposed on the sensing wires.

The first surface of the second substrate may be opposite to a second surface of the second substrate, the second surface facing the first substrate.

The first surface of the second substrate may face the first substrate.

The at least one opening may be a single opening, and the opening may extend over substantially the entire touch region.

The at least one opening may include multiple openings, and each of the openings may overlap a corresponding one of the com pads.

The common electrodes may be positioned over the pixel electrode.

The sensing wires may be formed under the common electrodes.

The transparent electrode layer may include a metal oxide.

The touch region may overlap a display area where a plurality of pixels are disposed.

According to an exemplary embodiment of the present invention, while forming the transparent electrode layer to prevent static electricity on the upper panel, an in-cell type display device recognizing the touch may be provided.

DETAILED DESCRIPTION OF THE EMBODIMENTS

Figure 1:
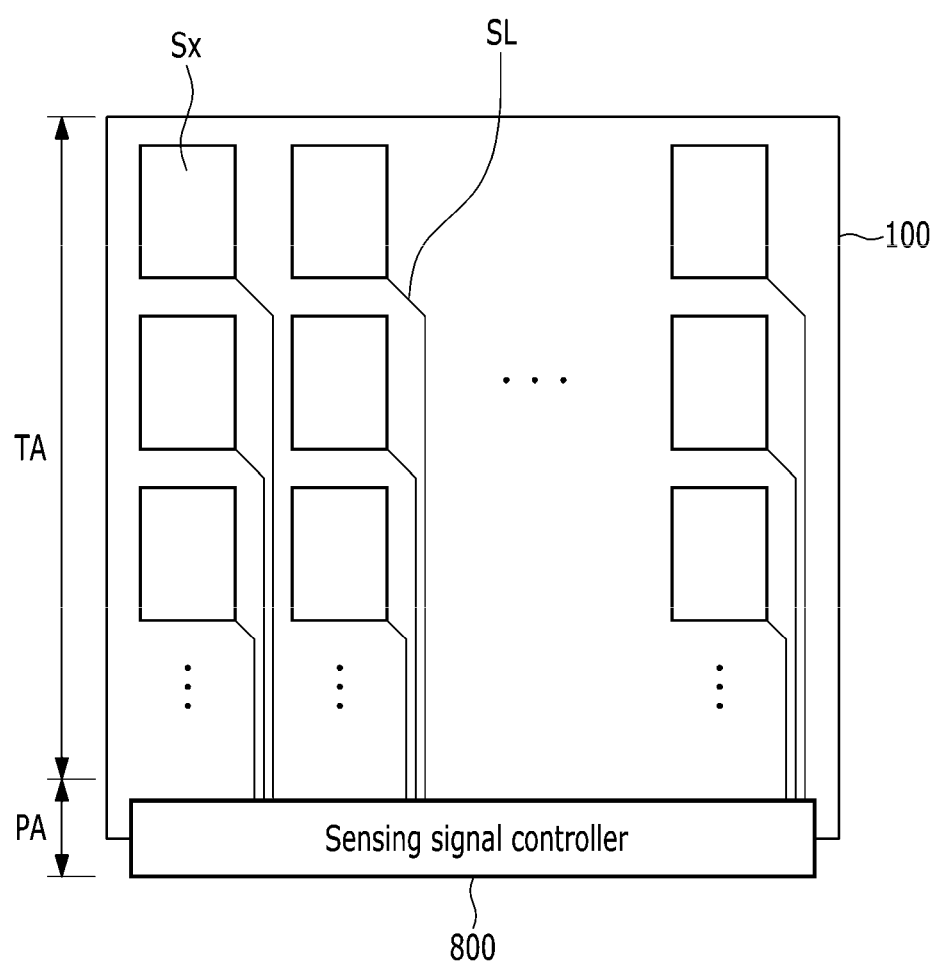
FIG. 1 is a plan view illustrating a touch sensor included in a display device according to an exemplary embodiment of the present invention.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

In the drawings, the thickness of layers, films, panels, regions, etc., are exaggerated for clarity. The various Figures are thus not to scale. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

All numerical values are approximate, and may vary. All examples of specific materials and compositions are to be taken as nonlimiting and exemplary only. Other suitable materials and compositions may be used instead.

Now, a display device according to an exemplary embodiment of the present invention will be described with reference to the accompanying drawings.

FIG. 1 is a plan view illustrating a touch sensor included in a display device according to an exemplary embodiment of the present invention.

As shown in FIG. 1, a display device according to an exemplary embodiment of the present invention includes a touch sensor and a sensing signal controller 800 connected to the touch sensor.

A touch sensor according to an exemplary embodiment of the present invention is a touch sensor capable of sensing a touch of an external object, and may be a touch sensor of various types. However, a capacitive type of touch sensor is described as an example in the present exemplary embodiment.

The touch sensor is included in a display panel, and senses a touch. The touch includes a case that an external object only approaches the display panel or the touch screen, as well as a case of direct contact with the display panel or the touch panel.

The touch sensor according to an exemplary embodiment of the present invention includes a plurality of touch electrodes Sx positioned in an active area of a substrate 100, and a plurality of sensing wires SL connected to the touch electrodes Sx. The active area is a region where the touch may be applied and the touch may be sensed, and may overlap a display area displaying an image in a case of a display panel. In the case of the substrate 100, the active area may be the touch region, and in the case of the in-cell type display in which the touch panel is installed in the display panel, the touch region may overlap the display area. Hereafter, the active region is referred to as a touch region (a touch area; TA).

A plurality of touch electrodes Sx may be arranged in a matrix shape, and in a cross-sectional view, they may be formed of or in the same layer. The touch electrode Sx may be made of a transparent conductive material such as ITO (indium tin oxide), IZO (indium zinc oxide), metal nanowires, a conductive polymer, and a thin metal layer, but is not limited thereto. The metal nanowire may be a silver (Ag) nanowire.

As shown in FIG. 1, a shape of the touch electrode Sx may be a quadrangle, for example a rhombus, however it is not limited thereto and various shapes may be provided. Particularly, the touch electrode Sx may include a plurality of protrusions and depressions (not shown) formed at an edge side to increase touch sensitivity. When the edge side of the touch electrode Sx includes a plurality of protrusions and depressions, the edge sides of the protrusions and depressions of the adjacent touch electrodes Sx are engaged with each other, i.e. protrusions of one touch electrode Sx may align with depressions of an adjacent touch electrode Sx.

A length of one side of the touch electrode Sx may be about several millimeters, for example less than about 10 mm, and in detail about 4 mm to about 5 mm, however a size of the touch electrode Sx may vary, for example, according to the touch sensing resolution.

A plurality of touch electrodes Sx are separated from each other within the touch region, and different touch electrodes Sx may be connected to the sensing signal controller 800 through different sensing wires SL.

The touch electrodes Sx according to the present exemplary embodiment respectively receive the sensing input signal from the sensing signal controller 800 through the sensing wires SL, and generate and output the sensing output signal according to detected contact, to the sensing signal controller 800. The sensing input signal and the sensing output signal are together referred to as a detection signal. Each touch electrode Sx forms a self-sensing capacitor to be charged with a predetermined charge amount after receiving the sensing input signal. Next, after an external object such as a finger makes contact, the charge amount of the self-sensing capacitor is changed such that a sensing output signal different from the input sensing input signal may be output. Accordingly, contact information such as contact existence and contact position may be obtained through the generated sensing output signal.

Each sensing wire SL connects its touch electrode Sx with the sensing signal controller 800 to transmit the sensing input signal or the sensing output signal. The sensing wires SL may be positioned at the same layer as the touch electrodes Sx and may be formed of the same material as the touch electrodes Sx. However, embodiments are not limited thereto, and the sensing wires SL may be positioned at a different layer from the touch electrodes Sx and may be connected to the sensing signal controller 800 through a separate connection.

In the exemplary embodiment shown in FIG. 1, the number of sensing wires SL disposed between touch electrode Sx columns is increased nearer the sensing signal controller 800. Accordingly, the size of the touch electrode Sx may be decreased nearer the sensing signal controller 800.

A width of the sensing wires SL may be more than about 10 um to less than 100 um, but it is not limited thereto. The sensing signal controller 800 is positioned in a peripheral area (PA) outside the touch region TA, and is connected to the touch electrode Sx of the substrate 100 to transmit the sensing input signal to the touch electrode Sx and to receive the sensing output signal. The sensing signal controller 800 processes the sensing output signal to generate contact information, such as the contact existence and the contact position.

The sensing signal controller 800 may be positioned on a separate printed circuit board (PCB) from the substrate 100, and may be connected to the substrate 100, may be attached on the substrate 100 as a type of an IC chip or a TCP type, or may be integrated on the substrate 100.

The structure of the touch sensor as in FIG. 1 may also be applied to a display device in which the pixel electrode and the color filter are formed in the same display panel as the thin film transistor.

Figure 2:
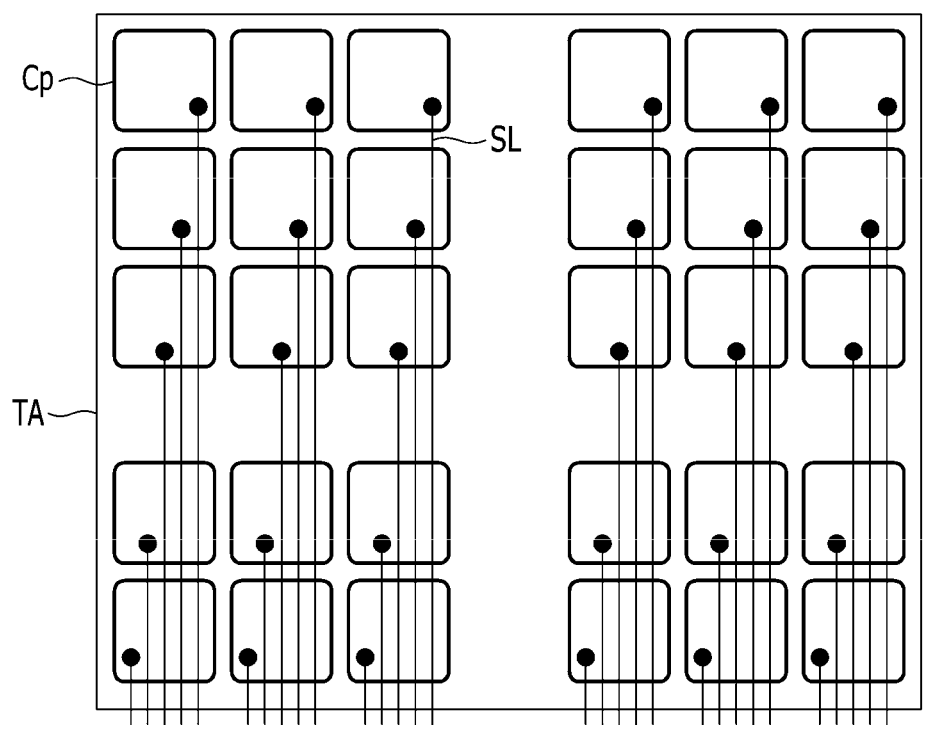
FIG. 2 is a plan view schematically showing a common electrode structure of a display device according to an exemplary embodiment of the present invention.

FIG. 2 is a plan view schematically showing a common electrode structure of a display device according to an exemplary embodiment of the present invention. Hereafter, an in-cell type liquid crystal display will be described, however the structure of the display device is not limited thereto. In detail, FIG. 2 shows the structure of the common electrode when the touch sensor described in FIG. 1 is inserted in the display device.

Referring to FIG. 2, in the display device incorporating the touch sensor, the structure of the common electrode is the same as the structure of the touch electrode described in FIG. 1.

The common electrode is formed of a plurality of com pads (Cp) or unit pads that are separate and distinct pads each covering a touch sensing area so as to form a self-sensing capacitor. When the contact of the external object such as the finger occurs on the upper panel of the liquid crystal display through the structure of the plurality of different com pads Cp, the amount of charge charged to the self-sensing capacitor is changed by the change in position of the com pad Cp, such that contact information such as a contact state or a contact position may be recognized.

The different com pads Cp are separate from each other and are arranged in a matrix shape. Different com pads Cp are connected to different sensing wires SL, respectively, and the sensing wires SL are separated from each other. The sensing wire SL applies the common voltage to the com pad Cp, and is arranged with the same shape as that described in FIG. 1.

The com pad Cp may correspond to at least one pixel PX, and the length of one side of the com pad Cp may be about several millimeters, for example less than about 10 mm, and in detail about 4 mm to about 5 mm. However, a size of the com pad Cp may vary according to, for example, the touch sensing resolution. Here, the pixel PX as a unit displaying the image may be defined by an opening region displaying the image, and includes a first transistor performing a function of a switching element, as well as a capacitive electronic element.

Figure 3:
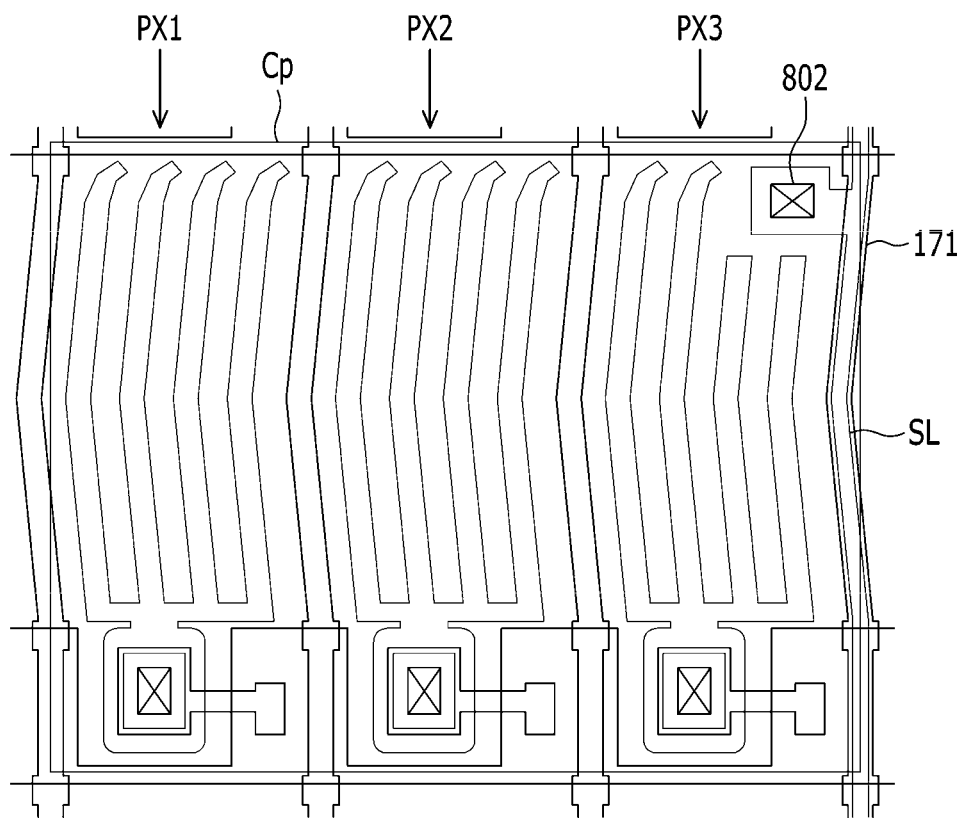
FIG. 3 is a layout view of a pixel of a display device according to an exemplary embodiment of the present invention.

FIG. 3 is a layout view of a pixel of a display device according to an exemplary embodiment of the present invention. The pixel arrangement may vary depending on the electrode structure of the display device, and the pixel arrangement shown in FIG. 3 relates to the display device using the common electrode having the com pad unit described in FIG. 2.

At least one pixel may be positioned corresponding to the com pad Cp. For example, one such pixel as shown in FIG. 3 may include three pixels PX1, PX2, and PX3. In this case, among the plurality of pixels overlapping one com pad, in any one pixel PX3, the sensing wire SL to apply the voltage to the common electrode may be arranged to overlap a data line 171.

In the pixel PX3 in which the sensing wires SL are arranged, the detection signal or voltage may be applied to the com pad Cp through the sensing contact hole 802.

However, the pixel structure shown in FIG. 3 is not limited to the case that the common electrode is deposited under the pixel electrode, and various exemplary embodiments may be proposed depending on the electrode structure of the display device.

On the other hand, in the case that the display device according to an exemplary embodiment of the present invention has a structure in which the common electrode and the pixel electrode are both formed in the same display panel as the thin film transistor, to prevent the static electricity generation in the upper panel, a rear surface electrode layer is coated in the upper panel. While the rear surface electrode layer coated in the upper panel prevents or reduces static electricity, when an external object contacts the display device including the touch sensor, the rear surface electrode layer prevents the field generated between the electrode part from sensing the contact.

Accordingly, to solve this problem, the in-cell type display device according to an exemplary embodiment of the present invention described with reference to FIG. 4 to FIG. 14 is used.

First, FIG. 4 to FIG. 8 explain the in-cell type display device according to an exemplary embodiment of the present invention.

Figure 4:
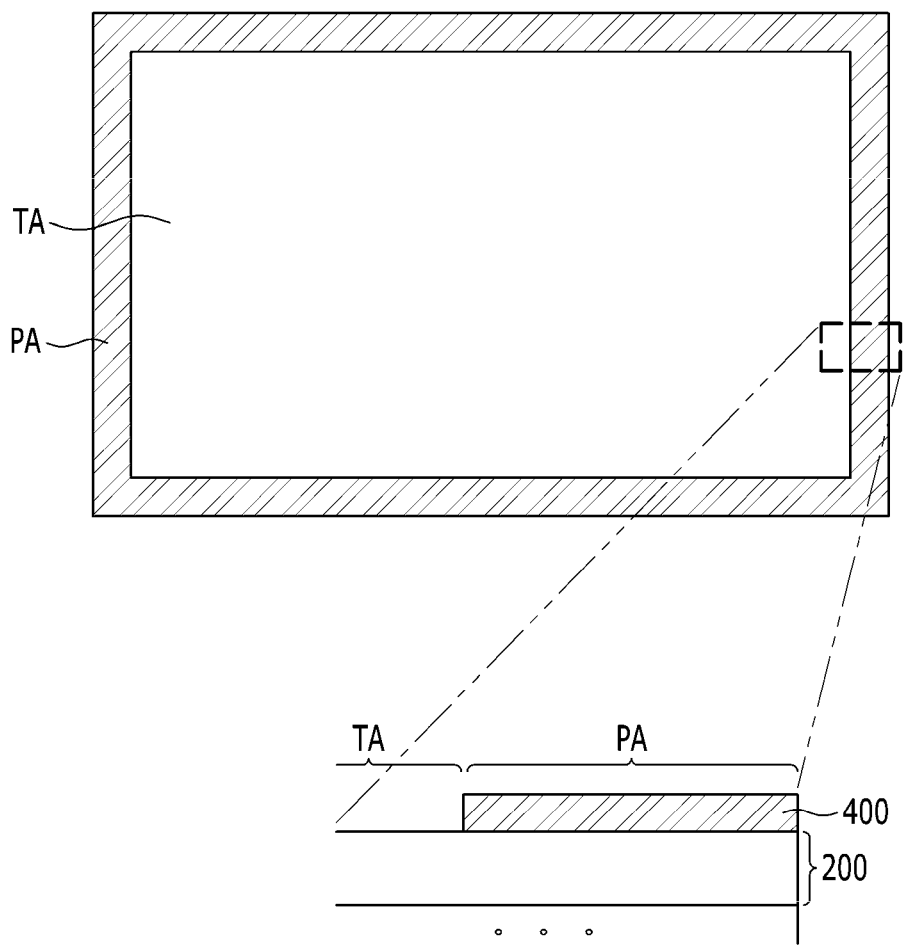
FIG. 4 is a plan view showing an entire display panel of a display device according to an exemplary embodiment of the present invention.
Figure 5:
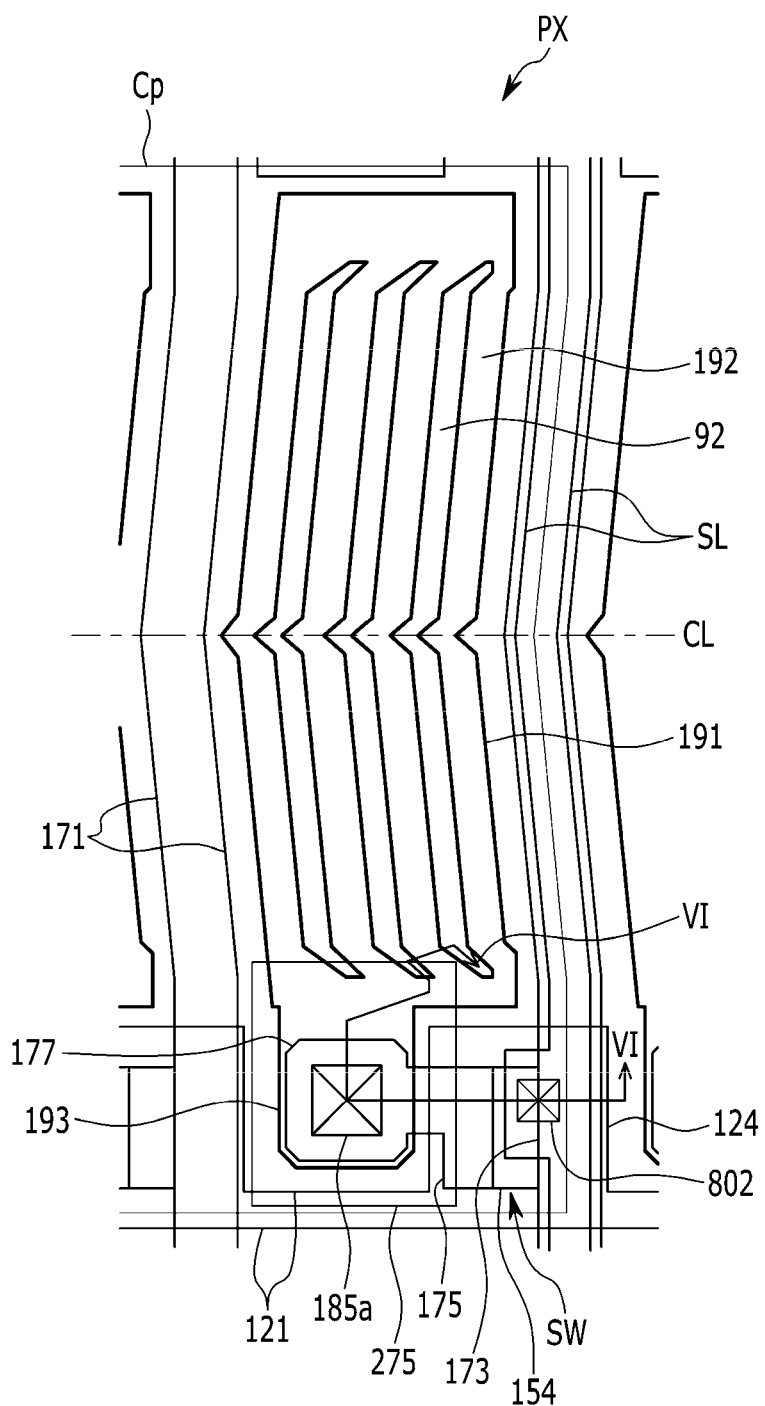
FIG. 5 is a layout view of one example of one pixel of the display device of FIG. 4.
Figure 6:
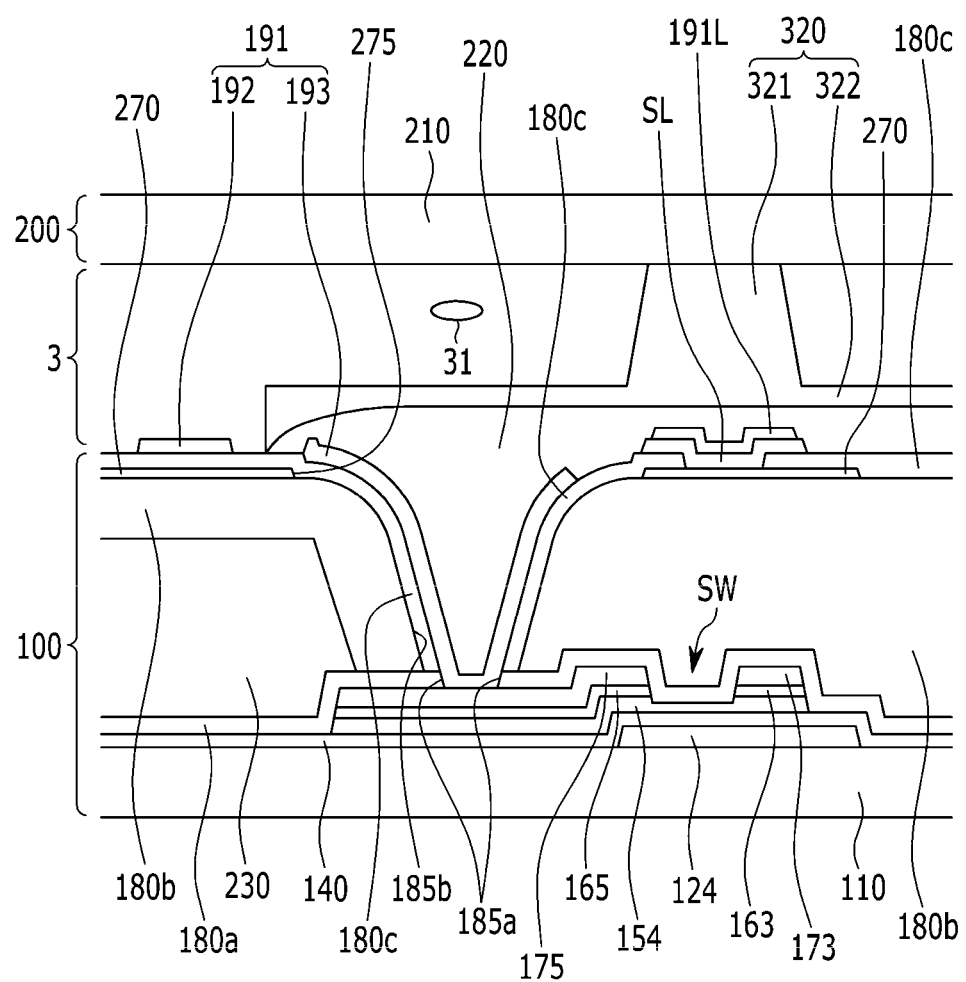
FIG. 6 is a cross-sectional view of the display device of FIG. 5 taken along a line VI-VI.
Figure 7:
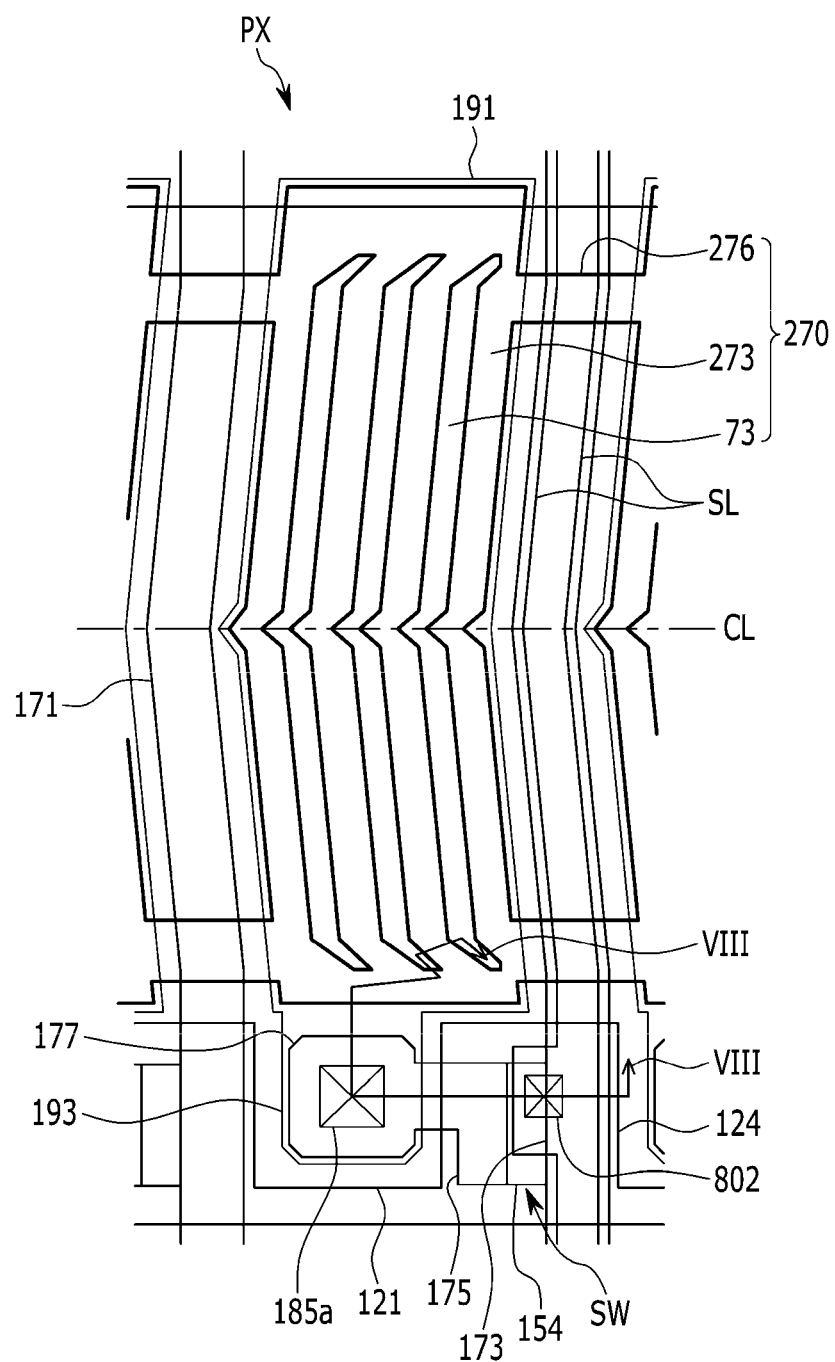
FIG. 7 is a layout view of another example of one pixel of the display device of FIG. 4.
Figure 8:
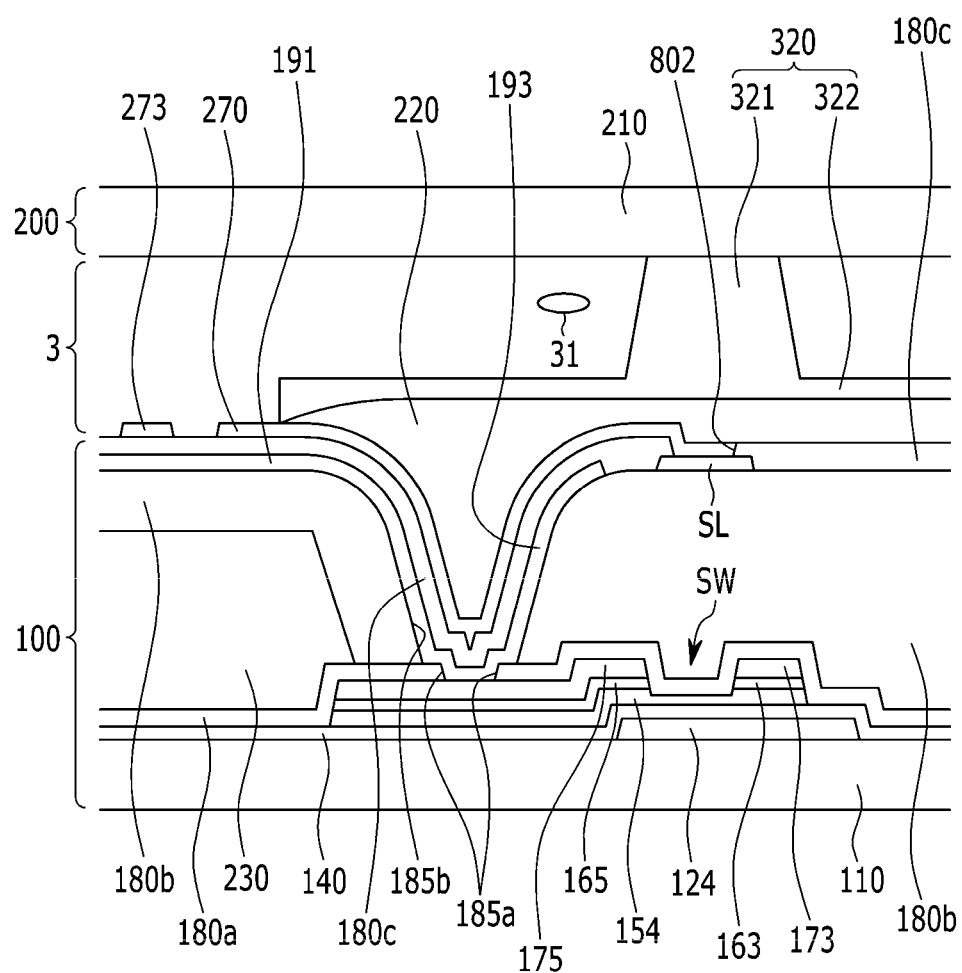
FIG. 8 is a cross-sectional view of the display device of FIG. 7 taken along a line VIII-VIII.

FIG. 4 is a plan view showing an entire display panel of a display device according to an exemplary embodiment of the present invention, FIG. 5 is a layout view of one example of one pixel of the display device of FIG. 4, and FIG. 6 is a cross-sectional view of the display device of FIG. 5 taken along a line VI-VI. FIG. 7 is a layout view of another example of one pixel of the display device of FIG. 4, and FIG. 8 is a cross-sectional view of the display device of FIG. 7 taken along a line VIII-VIII.

Referring to FIG. 4, the touch panel of the display device according to an exemplary embodiment of the present invention is divided into a touch region TA sensing the contact and a peripheral area PA enclosing the circumference of the touch region TA. For example, in the display device, the touch region TA may mainly correspond to the display area where the plurality of pixels are formed, however it is not limited thereto. The peripheral area PA may mainly correspond to a non-display area such as a bezel, but it is also not limited thereto.

In this case, the display device according to an exemplary embodiment of the present invention includes a transparent electrode layer 400 positioned over the com pad Cp forming the touch sensor and including a portion overlapping the peripheral area PA. The transparent electrode layer 400 may be positioned on any surface of the upper panel 200. Accordingly, referring to the cross-sectional view shown in FIG. 4, the touch region TA and the peripheral area PA may have different structures.

The transparent electrode layer 400 has at least one opening disposed at and overlapping the touch region TA. FIG. 4 shows an embodiment in which an opening of the transparent electrode layer 400 overlaps an entire area of the touch region TA, but the embodiments are not limited thereto. Since the transparent electrode layer 400 deposited on the upper panel 200 only exists in the peripheral area PA, touch sensing is possible in the touch region TA, and static electricity prevention may be achieved through the transparent electrode layer 400 formed along the peripheral area PA.

When the transparent electrode layer 400 is formed on the upper panel 200, the transparent electrode layer 400 may be formed only in the peripheral area PA by coating the transparent electrode material on the entire surface of the upper panel 200 and etching the transparent electrode material of the touch region TA so as to remove it from that region.

The transparent electrode layer 400 includes a transparent conductive material such as ITO and IZO.

Referring to FIG. 5 and FIG. 6, in the display device according to an exemplary embodiment of the present invention, the touch region (not shown) includes a lower panel 100 and the upper panel 200 facing each other, and a liquid crystal layer 3 injected therebetween.

The upper panel 200 includes an insulation substrate 210 made of a transparent glass or plastic.

The liquid crystal layer 3 includes liquid crystal molecules 31 having dielectric anisotropy. The liquid crystal molecules 31 are arranged such that their long axes are aligned to be parallel or perpendicular to the display panels 100 and 200 in a state that the electric field is not generated to the liquid crystal layer 3. The liquid crystal molecules 31 may be nematic liquid crystal molecules which spirally twist up to the upper panel 200 from the lower panel 100.

Referring to the lower panel 100, a gate conductor including a plurality of gate lines 121 is positioned on an insulation substrate 110 made of transparent glass, plastic, or the like.

The gate line 121 may transfer a gate signal and mainly extends in a horizontal direction. The gate line 121 includes a gate electrode 124.

The gate conductor may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), and titanium (Ti).

A gate insulating layer 140 made of a silicon nitride (SiNx), a silicon oxide (SiOx), or the like is formed on the gate conductor.

A semiconductor 154 is positioned on the gate insulating layer 140. The semiconductor 154 may include amorphous silicon, polysilicon, or an oxide semiconductor.

Ohmic contacts 163 and 165 may be positioned on the semiconductor 154. The ohmic contacts 163 and 165 may be made of a material such as n+ hydrogenated amorphous silicon in which n-type impurity such as phosphorus is doped at a high concentration, or a silicide. In the case where the semiconductor 154 is an oxide semiconductor, the ohmic contacts 163 and 165 may be omitted.

A data conductor including a data line 171 that includes a source electrode 173 and a drain electrode 175 is positioned on the ohmic contacts 163 and 165 and the gate insulating layer 140.

The data line 171 may transfer a data signal and mainly extend in a vertical direction to cross the gate line 121.

The data line 171 may be periodically curved. For example, as illustrated in FIG. 5, each data line 171 may be curved or bent at least one time at a portion corresponding to a horizontal center line CL of one pixel PX.

The data line 171 includes the source electrode 173. According to the exemplary embodiment illustrated in FIG. 5, the source electrode 173 may be positioned on the same line as the data line 171 without protruding from the data line 171.

The drain electrode 175 faces the source electrode 173. The drain electrode 175 may include a rod-shaped portion extending substantially in parallel with the source electrode 173, and an extension 177 which is opposite to the rod-shaped portion.

The data conductor may be made of a refractory metal such as molybdenum, chromium, tantalum, and titanium, or an alloy thereof, and may have a multilayered structure including a refractory metal layer (not illustrated) and a low resistive conductive layer (not illustrated).

The gate electrode 124, the source electrode 173, and the drain electrode 175 form one thin film transistor (TFT) SW together with the semiconductor 154.

A first passivation layer 180a is positioned on the data conductor, the gate insulating layer 140, and an exposed portion of the semiconductor 154. The first passivation layer 180a may be made of an organic insulating material or an inorganic insulating material. The first passivation layer 180a includes a contact hole 185a exposing a part of the drain electrode 175, for example, the extension 177.

A color filter 230 may be positioned on the first passivation layer 180a. The color filter 230 may display any color such as one of the primary colors, and an example of the primary colors may include three primary colors of red, green, and blue, three primary colors of yellow, cyan, and magenta, or four primary colors. According to another exemplary embodiment of the present invention, the color filter 230 may further include a color filter displaying a mixture of the primary colors, or white in addition to the primary colors. Each color filter 230 may be formed to be elongated, i.e. with long sides extending, along a pixel column or a pixel row.

The color filter 230 may be positioned on the upper panel 200.

A second passivation layer 180b is positioned on the color filter 230. The second passivation layer 180b may be made of an organic insulating material or an inorganic insulating material. The second passivation layer 180b prevents an impurity such as a pigment of the color filter 230 from flowing into the liquid crystal layer 3, and provides a flat upper surface.

When the second passivation layer 180b includes an organic insulating material, a thickness of the second passivation layer 180b may be approximately 1.0 µm or more, and more particularly, approximately 2.0 µm or more, but is not limited thereto. Further, a dielectric constant of the second passivation layer 180b may be approximately 10 or less, and more particularly, approximately 3.3 or less, but is not limited thereto.

The second passivation layer 180b may include an opening 185b corresponding to the contact hole 185a of the first passivation layer 180a. An edge of the opening 185b may surround an edge of the contact hole 185a as illustrated in FIG. 6 or 8, or may substantially coincide with the edge of the contact hole 185a.

A common electrode 270 may be positioned on the second passivation layer 180b. The common electrode 270 may have a planar shape over a pixel unit, however it forms the com pad Cp over the plurality of pixel units. The common electrode 270 may have an opening 275 formed at the region corresponding to the contact hole 185a. The edge of the opening 275 may enclose the contact hole 185a.

The common electrode 270 may be made of a transparent conductive material metal such as ITO or IZO.

A third passivation layer 180c is positioned on the common electrode 270. The third passivation layer 180c may include an inorganic insulating material or an organic insulating material.

A pixel electrode 191 is positioned on the third passivation layer 180c. The pixel electrode 191 may include a plurality of branch electrodes 192 overlapping the common electrode 270, and a protrusion 193 for connection with other layers. A slit 92 where the electrode is removed is formed between adjacent branch electrodes 192 of the pixel electrode 191. The protrusion 193 of the pixel electrode 191 is physically and electrically connected to the drain electrode 175 through the contact hole 185a of the first passivation layer 180a and the third passivation layer 180c, thereby receiving the data voltage from the drain electrode 175.

The pixel electrode 191 may be made of a transparent conductive material metal such as ITO or IZO.

The pixel electrode 191 may receive the data voltage through the thin film transistor, and the common electrode 270 may receive the common voltage Vcom. Then, the pixel electrode 191 and the common electrode 270, as two field generating electrodes, generate an electric field in the liquid crystal layer 3. As a result, the liquid crystal molecules 31 of the liquid crystal layer 3 positioned between the two electrodes 191 and 270 are re-arranged. Polarization of light passing through the liquid crystal layer 3 varies according to the re-arranged liquid crystal molecules, and an image at desired luminance may thus be displayed.

Referring to FIG. 6, a light blocking member 220 may be positioned on the pixel electrode 191. The light blocking member 220 is called a black matrix, and blocks light leakage between the pixels PX. The light blocking member 220 may include a pigment such as carbon black, and may include a photosensitive organic material.

However, the light blocking member 220, differently from FIG. 6, may be positioned in the upper panel 200, and in this case, the color filter 230 may also be positioned in the upper panel 200.

Again referring to FIG. 6, a transparent cover layer 320 is positioned on the light blocking member 220.

The cover layer 320 covers the light blocking member 220 to prevent a pigment component such as a halogen element as an impurity from flowing or diffusing into the liquid crystal layer 3. Accordingly, it is possible to prevent an afterimage due to the impurity flowing into the liquid crystal layer 3, and thereby enhance reliability of the liquid crystal display. To this end, the cover layer 320 may cover the entire surface of the exposed light blocking member 220.

The cover layer 320 does not include a pigment component, but may include a material without a reliability issue, for example, a transparent organic insulating material such as an acrylate or a transparent inorganic insulating material. In the case where the cover layer 320 is made of an organic insulating material, the cover layer 320 may include an organic insulating material having photosensitivity.

Referring to FIG. 6, the cover layer 320 may include a spacer 321 and a cover 322. The spacer 321 may maintain a separation distance between the lower panel 100 and the upper panel 200, and is called a spacer member. The cover 322 has a lesser thickness than the spacer 321, and may cover most of the light blocking member 220. As such, the cover layer 320 has portions having different thicknesses, and may be formed by using one optical mask. The thickness of the cover 322 of the cover layer 320 may be, for example, 1 µm or more, but is not limited thereto.

Also, in the region where the spacer 321 and the thin film transistor overlap each other, a sensing wire SL may be formed on the common electrode 270. In the display device shown in FIG. 5 and FIG. 6, the common electrode 270 as the portion of the com pad Cp is formed under the pixel electrode 191. The sensing wire SL contacts the common electrode 270 that is the portion of the com pad Cp through the contact hole 802 in the region where the spacer 321 and the thin film transistor SW overlap each other. Also, a transparent oxide layer 191L to prevent the wires from being exposed is formed on the sensing wire SL. The transparent oxide layer 191L is formed with the same layer as the pixel electrode 191 and may be formed of a transparent conductive material metal such as ITO or IZO.

Accordingly, a the sensing wire SL directly contacts the common electrode 270, the voltage of the common electrode 270 is applied through the sensing wire SL and the sensing input signal is input, the com pad Cp is charged with a predetermined charge amount, and if contact with the external object occurs, a change in the charge amount of the com pad is generated, thereby sensing the touch.

In the present exemplary embodiment, the common electrode 270 corresponding to at least one pixel electrode 191 may form the unit com pad Cp.

As described in FIG. 4, as the transparent electrode layer 400 coated on the upper panel 200 to prevent the static electricity is formed in the peripheral area PA such as a bezel region outside the touch region TA, in the display device shown in FIG. 5 and FIG. 6, touch sensing of a self-sensing charge method may be realized. In this case, there is only a single opening in the transparent electrode layer 400, and the opening overlaps the entire area of the touch region TA.

Although not illustrated, an alignment layer is coated on the pixel electrode 191 and the third passivation layer 180c, and the alignment layer may be a horizontal alignment layer. The alignment layer may be rubbed in a predetermined direction. However, according to another exemplary embodiment of the present invention, the alignment layer includes a photoreactive material to be photo-aligned.

On the other hand, for the display device according to a different exemplary embodiment of the present invention, the arrangement and the structure of the pixel electrode 191 and the common electrode 270 may vary from that shown in FIG. 5 and FIG. 6.

Next, referring to FIG. 7 and FIG. 8, the display device according to an exemplary embodiment of the present invention is largely the same as the exemplary embodiment shown in FIG. 5 and FIG. 6 as described above, however the deposition position of the pixel electrode 191 and the common electrode 270 may be different. Differences from the previous exemplary embodiment will be mainly described.

The pixel electrode 191 may be positioned on the second passivation layer 180b. The pixel electrode 191 of each pixel PX may have a planar shape. The pixel electrode 191 may include a protrusion 193 for connection with other layers. The protrusion 193 of the pixel electrode 191 is physically and electrically connected to the drain electrode 175 through the contact hole 185a to receive a voltage from the drain electrode 175.

A third passivation layer 180c may be positioned on the pixel electrode 191. The third passivation layer 180c may include an organic insulating material or an inorganic insulating material.

A common electrode 270 is positioned on the third passivation layer 180c. Common electrodes 270 positioned in the plurality of pixels PX are connected to each other through a connection bridge 276 and the like to transfer substantially the same common voltage Vcom. The common electrode 270 according to the exemplary embodiment may include a plurality of branch electrodes 273 overlapping the pixel electrode 191. A slit 73 at which an electrode is removed is formed between the adjacent branch electrodes 273.

A light blocking member 220 may be positioned on the common electrode 270. However, differently from FIG. 8, the light blocking member 220 may be positioned in the upper panel 200, and in this case, the color filter 230 may also be positioned in the upper panel 200.

In this case, since the display device shown in FIG. 7 and FIG. 8 has a structure in which the common electrode 270 is deposited on the pixel electrode 191, the sensing wire SL is formed on the second passivation layer 180b in the region overlapping the spacer 321 and the gate electrode 124. That is, the sensing wire SL is formed with the same layer as the pixel electrode 191, and the sensing wire SL directly contacts the common electrode 270 that forms the com pad Cp, through the contact hole 802. While the voltage is applied through the sensing wire SL and the sensing input signal is input, the com pad Cp made of the common electrode 270 positioned in at least one pixel PX is charged with a predetermined charge amount if contact by an external object occurs, and a change in charge amount of the com pad Cp occurs, thereby sensing the touch.

As described in FIG. 4, to prevent static electricity, as the rear surface transparent electrode layer 400 coated on the upper panel 200 is coated in the peripheral area PA such as the bezel region outside the touch region TA, in the liquid crystal display shown in FIG. 7 and FIG. 8, touch sensing of a self-sensing charge method may be realized.

Also, although not shown, the alignment layer may be coated on the common electrode 270 and the third passivation layer 180c, and the alignment layer may be a horizontal alignment layer. The alignment layer may be rubbed in a predetermined direction. However, according to another exemplary embodiment of the present invention, the alignment layer includes a photoreactive material to be photo-aligned. Next, FIG. 9 to FIG. 13 illustrate an in-cell type display device according to another exemplary embodiment of the present invention.

Figure 9:
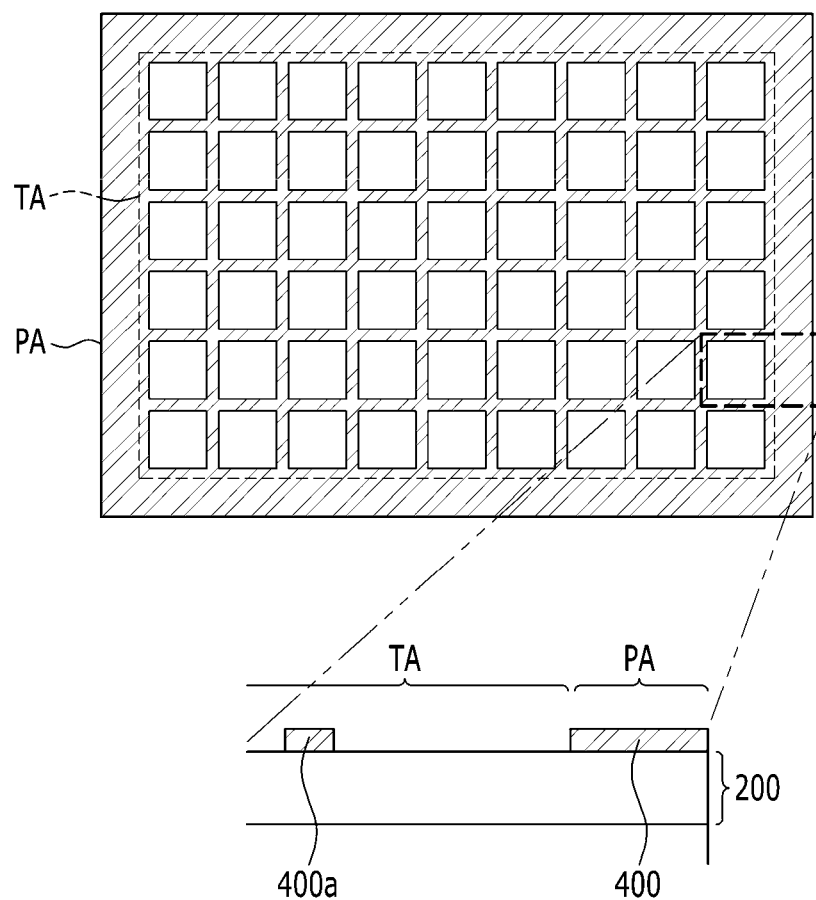
FIG. 9 is a plan view of an entire display panel of a display device according to another exemplary embodiment of the present invention.
Figure 10:
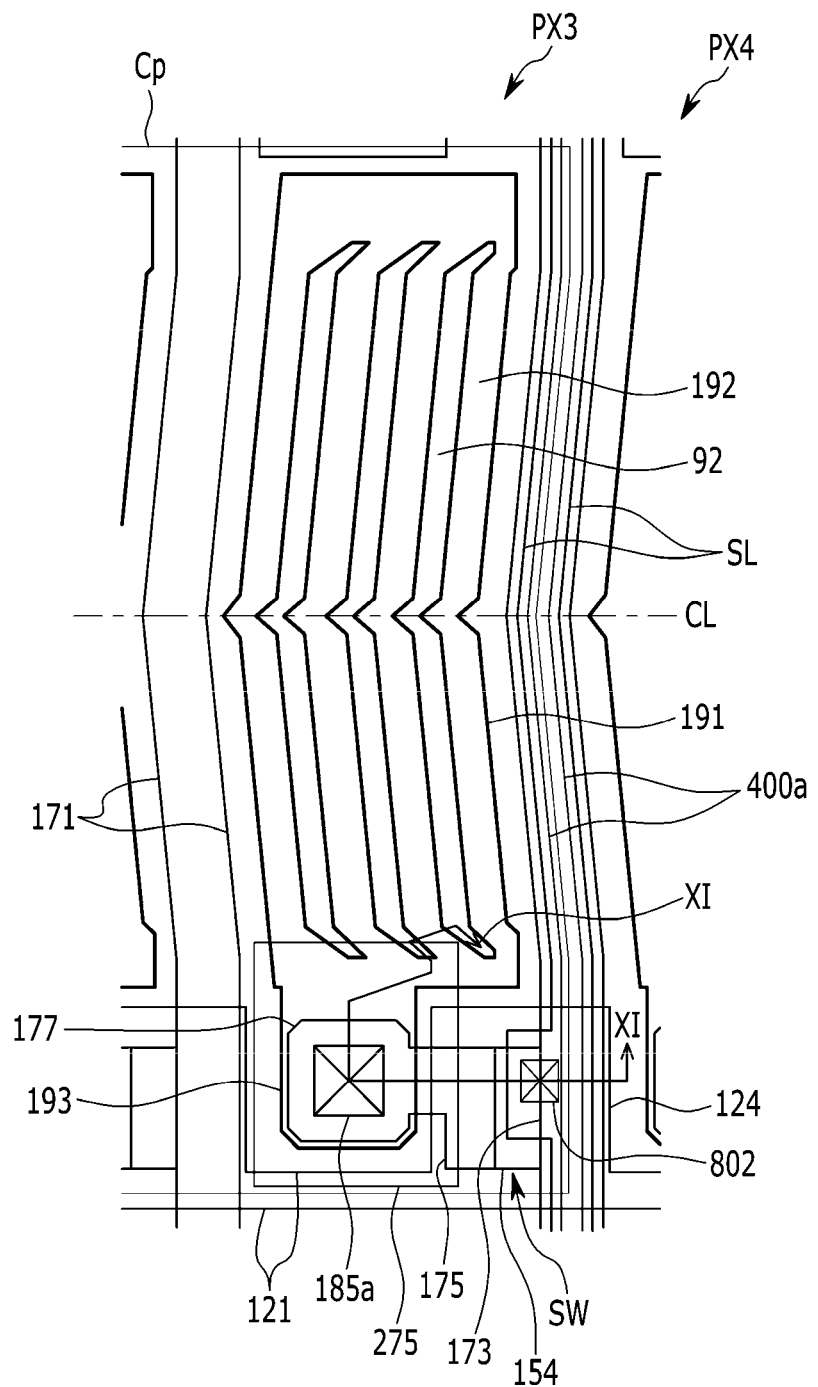
FIG. 10 is a layout view of one pixel of the display device of FIG. 9.
Figure 11:
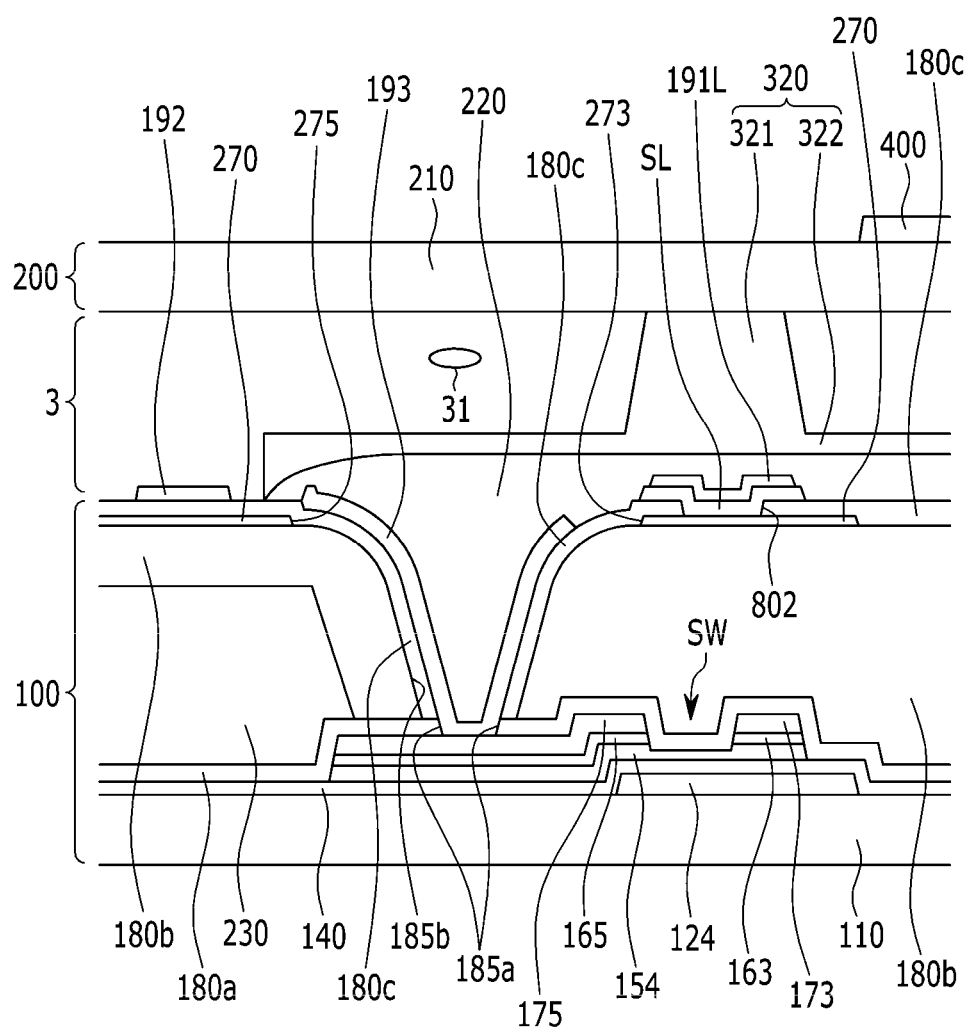
FIG. 11 is a cross-sectional view of the display device of FIG. 10 taken along a line XI-XI.
Figure 12:
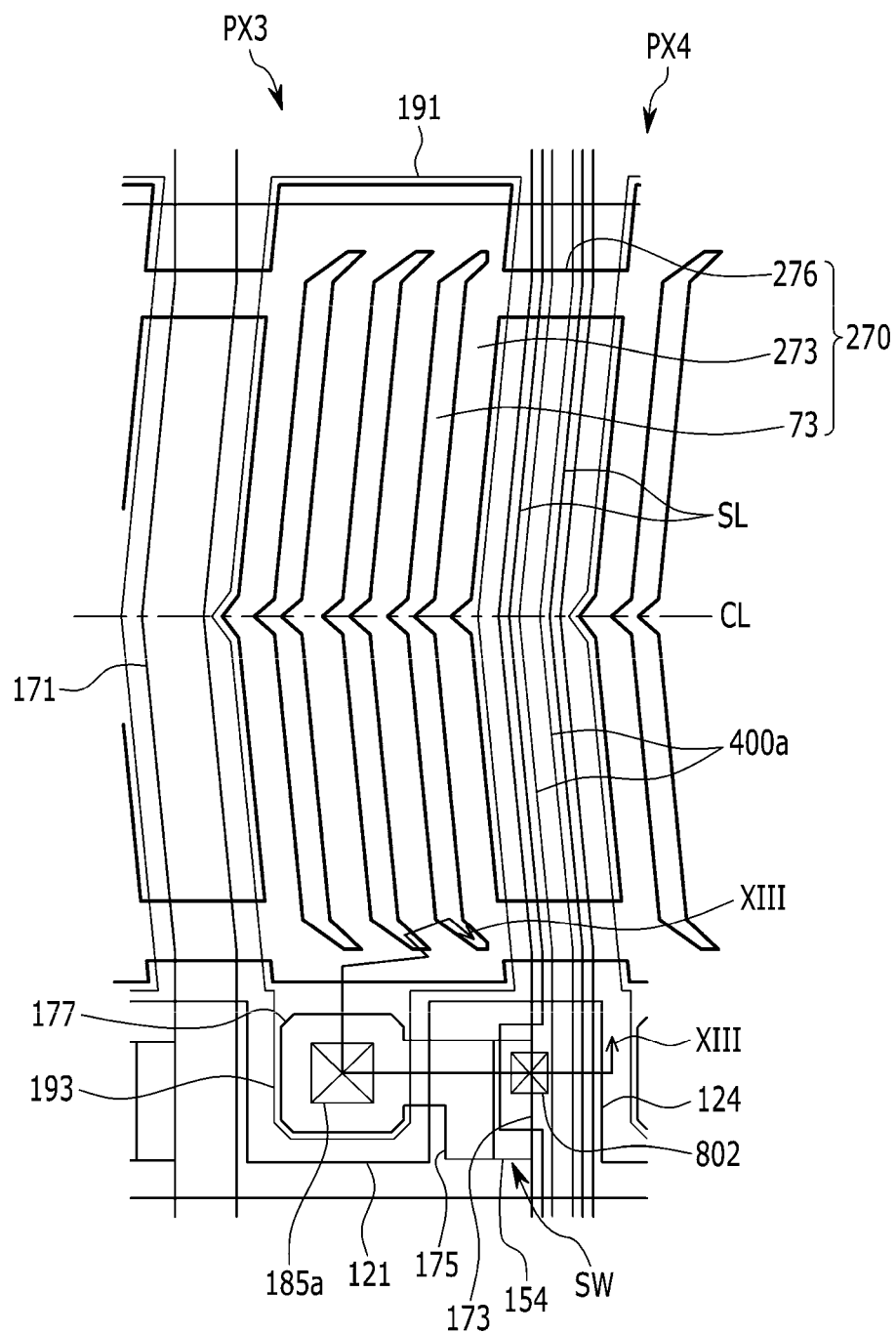
FIG. 12 is a layout view of another example of one pixel of the display device of FIG. 9.
Figure 13:
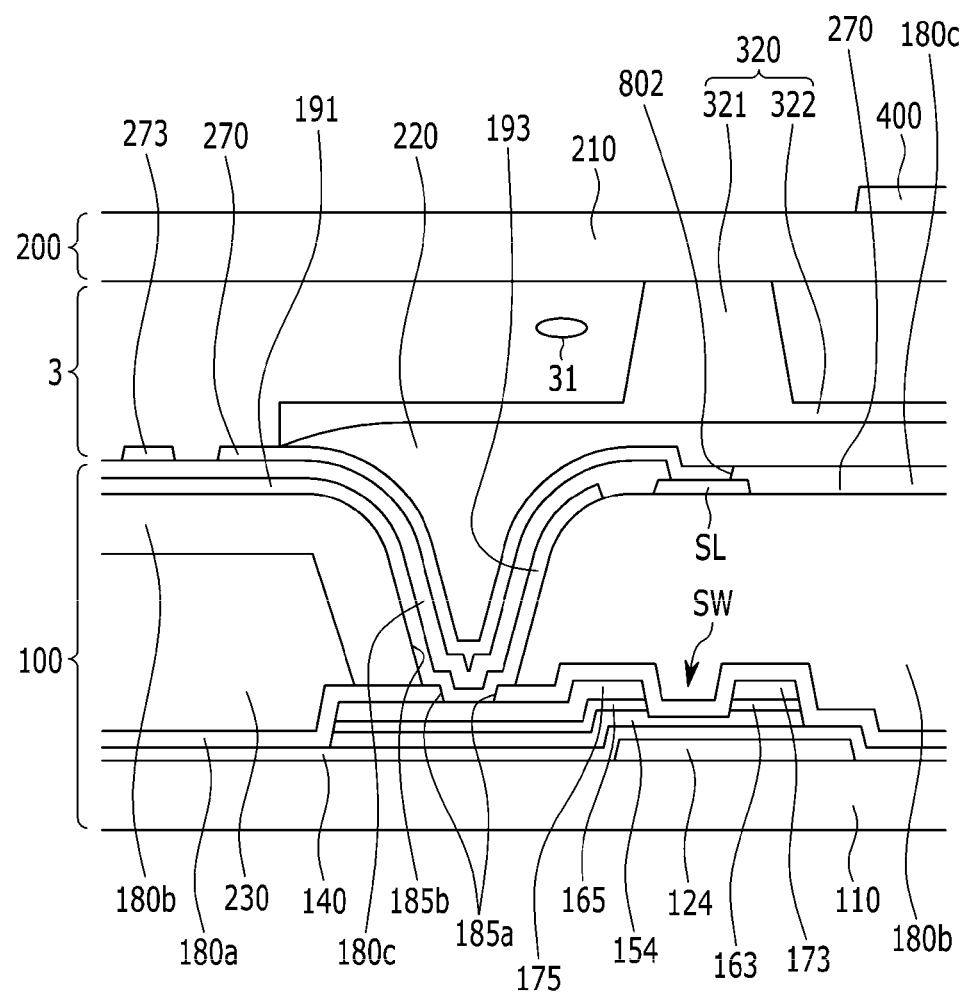
FIG. 13 is a cross-sectional view of the display device of FIG. 12 taken along a line XIII-XIII.

FIG. 9 is a plan view of an entire display panel of a display device according to another exemplary embodiment of the present invention, FIG. 10 is a layout view of one pixel of the display device of FIG. 9, and FIG. 11 is a cross-sectional view of the display device of FIG. 10 taken along a line XI-XI. FIG. 12 is a layout view of another example of one pixel of the display device of FIG. 9, and FIG. 13 is a cross-sectional view of the display device of FIG. 12 taken along a line XIII-XIII.

Referring to FIG. 9 to FIG. 13, the display device according to another exemplary embodiment of the present invention is similar to the exemplary embodiment shown in FIG. 4 to FIG. 8 except for the structure of the transparent electrode layer 400 deposited on the upper panel 200. Differences from the previous exemplary embodiment will be mainly described.

Referring to FIG. 9, the touch panel of the liquid crystal display according to another exemplary embodiment of the present invention is divided into the touch region TA and the peripheral area PA, and the transparent electrode layer 400 to prevent the static electricity is deposited on the overlapping upper panel 200 in the peripheral area PA. Also, in the touch region TA, when the plurality of com pads Cp described in FIG. 2 are arranged in the matrix shape, a transparent electrode layer 400a is formed in a net or grid pattern. That is, the transparent electrode layer 400a has a plurality of openings disposed in the touch region TA, and each of the openings corresponds to and overlaps each corresponding com pad Cp. That is, as the transparent electrode layer 400a is formed in the spaces between adjacent com pads Cp in the touch region TA. In this manner, dissipation of static electricity is more easily carried out throughout the entire panel, making touch sensing more effective in the region of the com pad Cp.

Accordingly, referring to the cross-sectional view shown in FIG. 9, in the touch region TA, the transparent electrode layer 400 is not deposited in the upper panel 200 overlapping the com pad Cp, and instead the transparent electrode layers 400 and 400a are deposited on the upper panel 200 to correspond to the spaces between adjacent com pads Cp.

The transparent electrode layers 400 and 400a include a transparent conductive material such as ITO and IZO.

In the structure of the transparent electrode layer formed on the upper panel 200 shown in FIG. 9, the transparent electrode material is coated on the entire surface of the upper panel 200, and this transparent electrode material is etched away in the region overlapping the plurality of com pads Cp to form the net or grid pattern shown.

As the transparent electrode layer deposited on the upper panel 200 is removed in the regions overlapping the com pads Cp, in the touch region TA, better touch sensing may be realized and prevention or dissipation of static electricity may be achieved.

Referring to FIG. 10 and FIG. 12, in the outermost positioned first pixel PX3, the transparent electrode layer 400a is formed in the boundary region with the second pixel PX4. The first pixel PX3 is a pixel positioned outermost among the plurality of pixels corresponding to the first com pad, and the second pixel PX4 is a pixel adjacent to the first pixel PX3 among the pixels included in a second com pad adjacent to the first com pad.

In the touch region TA, as the transparent electrode layer 400a is formed to have a net shape, the transparent electrode layer 400a is formed between the first pixel PX3 and the second pixel PX4, and cross-sections thereof are shown in FIG. 11 and FIG. 13.

FIG. 10 and FIG. 11 show structures in which the common electrode 270 is formed under the pixel electrode 191, and FIG. 12 and FIG. 13 show structures in which the common electrode 270 is formed on the pixel electrode 191.

Figure 14:
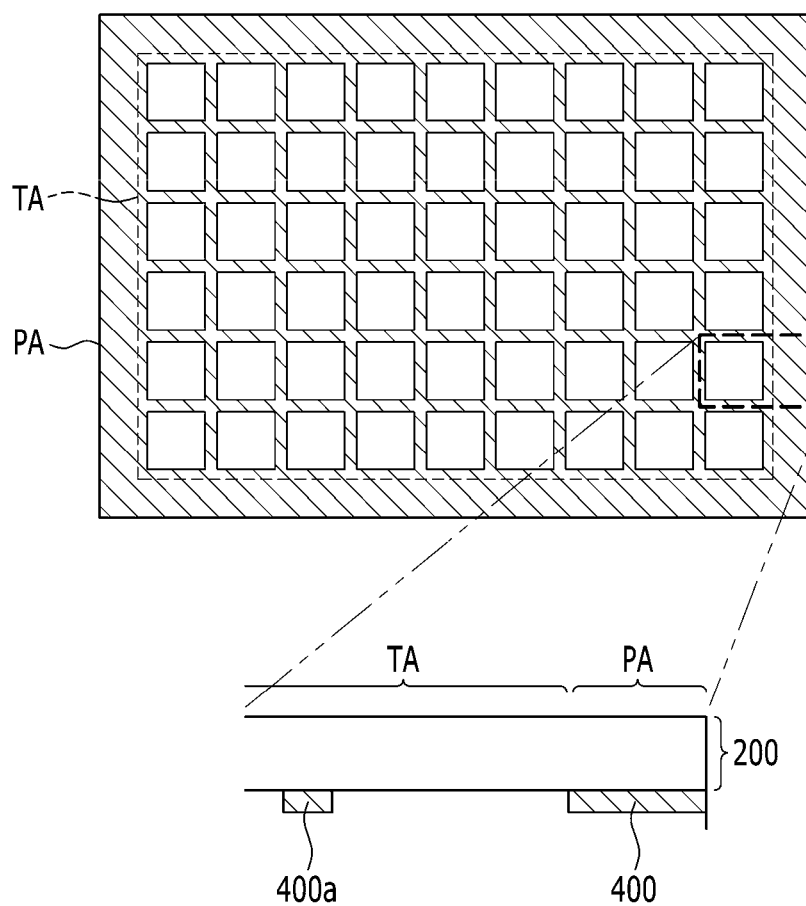
FIG. 14 is a plan view of an entire display panel of a display device according to another exemplary embodiment of the present invention.

Next, FIG. 14 illustrates a plan view of an in-cell type display device according to another exemplary embodiment of the present invention.

Referring to FIG. 14, the display device according to another exemplary embodiment of the present invention is similar to the exemplary embodiment shown in FIG. 9, however the position of the transparent electrode layers 400 and 400a may be different with reference to the upper panel 200. Differences from the previous exemplary embodiments will be described.

Referring to FIG. 14, in the touch panel of the liquid crystal display according to another exemplary embodiment of the present invention, the transparent electrode layer 400 is formed to have a net pattern 400a defining a plurality of openings disposed in the touch region TA, and includes a portion formed in the peripheral area PA. In this case, the transparent electrode layers 400 and 400a are formed on the lower surface of the upper panel 200, differently from FIG. 9. That is, the transparent electrode layer 400 and 400a may be formed inside the touch panel.

The transparent electrode layer 400 and 400a includes transparent conductive material such as ITO and IZO. The net pattern 400a of the transparent electrode layer 400 may be omitted, which may result in only a single opening in the transparent electrode layer 400 that overlaps the entire area of the touch region TA.

Meanwhile, in the above-described exemplary embodiments of the present invention, the light blocking member 220 and the color filter 230 are formed in the same display panel as the pixel electrode 191 and the thin film transistor, but is the various embodiments are not limited thereto. According to another exemplary embodiment of the present invention, the light blocking member 220 may be positioned in the upper panel 200, and in this case, the color filter 230 may also be positioned in the upper panel 200.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Various features of the above described and other embodiments can be mixed and matched in any manner, to produce further embodiments consistent with the invention.

DESCRIPTION OF SYMBOLS

100: display panel 110: insulation substrate
121: gate line 140: gate insulating layer
171: data line 173: source electrode
175: drain electrode 180a, 180b, 180c: passivation layer
191: pixel electrode 200: upper panel
220: light blocking member 230: color filter
270: common electrode 400, 400a: transparent electrode layer
Cp: com pad SL: sensing wire

What is claimed is:

1. A display device comprising:
a first substrate including a touch region in which a plurality of sensors for sensing a touch are disposed and a peripheral area disposed outside of the touch region;
a second substrate facing the first substrate;
thin film transistors disposed on the first substrate;
pixel electrodes respectively connected to the thin film transistors;
common electrodes arranged to transmit a common voltage;
sensing wires electrically connected to the common electrodes and arranged to transmit a detection signal for sensing a touch; and
a transparent electrode layer disposed on a first surface of the second substrate, the transparent electrode layer including a first portion and a second portion disposed in the peripheral area, and having at least one opening disposed in the touch region,
wherein the first portion is elongated in a first direction, the second portion is elongated in a second direction different from the first direction, and the first portion is connected to the second portion in a plan view, and
wherein the transparent electrode layer is disposed not to overlap the common electrodes in a plan view.

2. The display device of claim 1, further comprising:
a first insulating layer which is disposed on the thin film transistor; and
a second insulating layer disposed between the pixel electrodes and the common electrodes,
wherein the pixel electrode and the common electrodes are disposed on the first insulating layer.

3. The display device of claim 2, wherein a common electrode of the common electrodes overlapping at least one of the pixel electrodes forms one com pad corresponding to a sensor of the plurality of sensors.

4. The display device of claim 2, wherein the common electrodes form a plurality of com pads which are separate from each other and are arranged in a matrix shape, each of the plurality of com pads being respectively connected to a different sensing wire and corresponding to each sensor of the plurality of sensors.

5. The display device of claim 2, further comprising a transparent oxide layer disposed on the sensing wires.

6. The display device of claim 2, wherein the first surface of the second substrate is opposite to a second surface of the second substrate, the second surface facing the first substrate.

7. The display device of claim 6, wherein:
the at least one opening is a single opening extending over an entirety of the touch region, and
the single opening overlaps the plurality of sensors.

8. The display device of claim 6, wherein:
the at least one opening includes multiple openings, and
each of the multiple openings overlaps a center of each corresponding sensor of the plurality of sensors.

9. The display device of claim 2, wherein the first surface of the second substrate faces the first substrate.

10. The display device of claim 9, wherein:
the at least one opening is a single opening extending over an entirety of the touch region, and
the single opening overlaps the plurality of sensors.

11. The display device of claim 9, wherein
the at least one opening includes multiple openings, and
each of the multiple openings overlaps a center of each corresponding sensor of the plurality of sensors.

12. The display device of claim 2, wherein the common electrodes are disposed over the pixel electrode in a cross-sectional view.

13. The display device of claim 12, wherein the sensing wires are formed under the common electrodes.

14. The display device of claim 13, wherein the first surface of the second substrate is opposite to a second surface of the second substrate, the second surface facing the first substrate.

15. The display device of claim 1, wherein the transparent electrode layer includes a metal oxide.

16. The display device of claim 1, wherein the touch region overlaps a display area where a plurality of pixels are disposed.

* * * * *